United States Patent [19]
Kim et al.

[11] Patent Number: 5,765,590
[45] Date of Patent: Jun. 16, 1998

[54] OPPOSITE WAY PRESSURE DETECTING TYPE SHUTTLE RELIEF VALVE

[75] Inventors: Hyeong-Yee Kim; Yoong-Beom Lee, both of Changwon-si, Rep. of Korea

[73] Assignee: Korea Institute of Machinery & Materials, Rep. of Korea

[21] Appl. No.: 627,874

[22] Filed: Apr. 3, 1996

[30] Foreign Application Priority Data

Apr. 3, 1995 [KR] Rep. of Korea .......... 95-7718

[51] Int. Cl.[6] .................................. F16K 17/26
[52] U.S. Cl. .................................. 137/493.9
[58] Field of Search ....................... 137/493.9, 493

[56] References Cited

U.S. PATENT DOCUMENTS

| | | | |
|---|---|---|---|
| 3,807,443 | 4/1974 | Jacobs | 137/493.9 |
| 4,016,903 | 4/1977 | Akashi et al. | 137/493.9 |
| 4,439,984 | 4/1984 | Martin | 137/493.9 |
| 4,476,890 | 10/1984 | Kawasaki et al. | 137/493.9 |
| 4,820,136 | 4/1989 | Saurwein | 137/493.9 |
| 5,048,561 | 9/1991 | Taplin et al. | 137/493.9 |
| 5,462,341 | 10/1995 | Koyano et al. | 137/493.9 |

*Primary Examiner*—Denise L. Ferensic
*Assistant Examiner*—Joanne Y. Kim
*Attorney, Agent, or Firm*—Blakely Sokoloff Taylor & Zafman

[57] ABSTRACT

The present invention provides a shuttle relief valve comprising a housing provided with left and right conduit holes respectively connected to the left and right conduits which are arranged between a pressure source and a hydraulic motor in a hydraulic circuit system, and a space portion communicating the conduit holes with each other. A spool is slidably disposed in the space portion so that the space portion is selectively opened or closed by the movement of the spool. A spring urges the spool into the position in which the space portion is closed, and a left cover is fitted in one hollow portion of the housing formed on one side of the space portion so that it supports the movement of the left portion of the spool. A bushing is fitted in the other hollow portion of the housing formed on the other side of the space portion so that it supports the movement of the right portion of the spool.

1 Claim, 7 Drawing Sheets

OPPOSITE WAY PRESSURE DETECTING TYPE SHUTTLE RELIEF VALVE

BACKGROUND OF THE INVENTION

1. Field of the Invention

The present invention relates to an opposite-way pressure detecting-type shuttle relief valve and, more particularly, to a relief valve which can detect pressure applied to opposite ends thereof so that relatively higher pressure applied to one end thereof can be automatically released, thereby obtaining the same effect as that when using two valves.

2. Description of Related Art

Generally, a hydraulic motor rotatable in opposite directions is a device which can convert force of hydraulic pressure into rotational power. This motor generally is rotated by working fluid which is controlled through a hydraulic circuit shown in FIG. 1 and thus rotates a rotor 50 coupled in a common axis therewith.

Furthermore, the hydraulic motor 52 is designed to be capable of changing its rotating direction between opposite directions by changing the flow direction of the working fluid generated from a pressure source 53.

This changing of the flow direction of the working fluid is performed in the hydraulic circuit. This hydraulic circuit comprises a plurality of conduits 54 and 56 which communicate the hydraulic motor 52 with the pressure source 53.

That is, the working fluid fed from the pressure source 53 is fed through one of the conduits 54 and 56 to the hydraulic motor 52 to rotate it and is then returned through the other conduits to an oil tank 58.

Further, a directional control valve 60 is mounted on one of the conduits 54 and 56 so that working fluid which is to be fed to the hydraulic motor can be selectively controlled in its flow direction, thereby changing the rotation direction of the hydraulic motor 52.

The directional control valve 60 changes the flow direction of the working fluid flowing along the conduits in accordance with an On./Off operation of solenoid valves 62 and 64. However, when controlling the rotation direction of the hydraulic motor 52 by using the directional control valve 60, excessive pressure, which is instantaneously generated by inertia of the hydraulic motor 52, is applied to the conduit 56 or 54, such that parts constituting the hydraulic circuit can be damaged.

Accordingly, to prevent the damage, relief valves 66 and 68 are respectively mounted on the conduits 54 and 56 so that the working fluid having excessive pressure applied to one of the conduits 54 and 56 can be flowed towards the other conduit.

The relief valves 66 and 68 are disposed in an opposite direction to each other so as to alternatively regulate hydraulic pressure of the conduits 54 and 56.

As described above, the relief valves 66 and 68 restricts the highest pressure of the conduits 54 and 56 so that hydraulic pressure within the circuit can be maintained to be lower than a predetermined value, thereby preventing part of the hydraulic pressure from becoming over-loaded pressure.

On the one hand, as shown in FIG. 2, as the relief valve, a direct operating-type has been widely used. the relief valve 66 or 68 includes a poppet valve 72 which closes an outlet for the working fluid by being biased by a pressure regulating spring 70.

Furthermore, when the working fluid having pressure higher than that of the elastic force of the pressure regulating spring 70 comes through an inlet 76, the poppet valve 72 moves in an opening direction to open the outlet 74 such that the working fluid can exit through the outlet 74.

As described above, the opposite-way pressure detecting-type relief valve having a plurality of relief valves 66 and 68 feeds hydraulic working fluid fed from the pressure source 53 to the hydraulic motor 52 through the directional control valve 60 along the conduit 54.

Accordingly, the hydraulic motor 52 and the rotor 50 coupled to the hydraulic motor in a common axis rotate for example, in a clockwise direction by hydraulic force of the working fluid.

To change the rotation direction of the hydraulic motor 52 and the rotor 50, when a current is applied to the solenoid valves 62 and 64 of the directional control valve 60, the directional control valve 60 permits the working fluid to flow to the hydraulic motor 52 through the conduit 56.

As a result, the working fluid rotates the hydraulic motor 52 and the rotor 50 in a counter-clockwise direction and is returned to the fluid tank 58 through the conduit 54.

At this point, the conduit 56 is applied with excessive pressure by working fluid which is pumped in accordance with inertia force of the hydraulic motor 52. At this state, the working fluid flows into the inlet of the relief valve 66 to push the poppet valve 72.

Accordingly, the poppet valve 72 moves to open the outlet 74 while compressing the spring such that the working fluid entering into through the inlet 76 flows along the conduit through the outlet 74 to release the excessive pressure applied to the conduit 56, thereby alleviating shock.

On the contrary, when the flow direction of the working fluid is changed by the directional control valve 60 to change again the rotation direction of the hydraulic motor 52 and the rotor 50 in the clockwise direction, the excessive pressure of the working fluid pressurized by inertia force of the hydraulic motor from the conduit 65 is applied to the conduit 54.

The working fluid having such an excessive pressure enters into the relief valve 68 through the inlet 76 and pushes the poppet valve 72 to flow into the conduit 56, thereby releasing the excessive pressure applied to the conduit 54.

As described above, when changing the flow direction of the working fluid, by releasing the excessive pressure applied respectively to the conduits 54 and 56, impact force applied to each part can be alleviated to thereby protect the parts.

However, in this relief valve, since the excessive pressure can be controlled in only one way direction, a plurality of relief valve are required, causing the hydraulic circuit complicate and making it difficult to make the hydraulic circuit compact. So, in recent years, to solve these problems, a relief valve which can detect pressure at its opposite directions has been proposed.

This relief valve is generally disposed on parallel passages between the directional control valve and the hydraulic motor to make fluid within a higher pressure side flow to a lower pressure side which pushing a valve spool biased by a spring in accordance with the operation of the directional control valve so that the excessive pressure applied on one of the opposite conduits of the valve can be released.

The Japanese unexamined patent No. P2-212684 discloses such a relief valve having a piston 80 as shown in FIGS. 3 and 4.

The piston 80 is disposed in a piston body 82 and moves in accordance with hydraulic pressure fed through a conduit 84.

The relief valve further comprises a spool 90 disposed in a spool body fixedly coupled to the piston body 82. The piston partially extents to the spool body 86. The spool forms a conduits 88 communicating with a conduit 84 of the piston such that the spool 90 moves in accordance with the movement of the piston by hydraulic pressure fed through the conduits 84 and 88.

The spool 90 has a hydraulic working portion on its outer circumference so that hydraulic pressure coming through right and left conduit holes 92 and 94, which are formed through the spool body 86 to communicate with each hydraulic pressure line of the hydraulic circuit, can act on one face of the piston 80 through the conduit 88 formed through the spool 90.

Further, the spool 90 moves hydraulic pressure coming through left conduit hole 94 or the piston 80 toward the right in the drawing. At this point, to support the spool with a predetermined pressure, the other spool 98 is disposed on the right side of the spool 90 and the spool 98 is biased by a spring 100.

The spring 100 and the spool 98 are housed in a cap 102 fixedly disposed on the spool body 86.

In this opposite-way pressure detecting-type relief valve, when excessive pressure acts on the right conduit hole 92, the excessive pressure acts on the one side of the piston 80 through the conduits 88 and 84 respective of the spool 90 and spring 80 to move the piston 80 toward the right in the drawing.

Accordingly, the piston 80 pushes the spool 90 toward the right and, at this point, as shown in FIG. 5, the spool 90 overcomes the elastic force of the spring 100 to further move, thereby communicating the right and left conduit holes 94 and 92 with each other to release the excessive pressure acting on the right conduit hole 92.

On the contrary, when excessive pressure acts on the left conduit hole 92, the excessive pressure acts on a hydraulic working face 96 of the spool 90 to thereby move the spool toward the right in the drawing while overcoming the elastic force of the spring 100, such that the left and right conduit holes 94 and 92 become communicated with each other through the hydraulic working face 96, thereby releasing the excessive pressure acting on the left conduit hole 94.

When the excessive pressure is release as described above, the piston 80 and the spool 90, or the spool 90 are/is returned toward the left by the spool 98 which is pushed by elastic force of the spring 100 higher than the given pressure.

However, in the prior opposite-way pressure detect-type relief valve, when designing this in a large capacity, the diameter of the spool should be large to obtain the large flow amount of the fluid, whereby the spring for returning the spool should be also large, making it difficult to make the relief valve to be compact.

Furthermore, as another scheme, moving amount of the spool can be increased to design the valve in a large capacity. In this case, since the size of the spool and the spring should also be large, it is also difficult to make the relief valve compact.

SUMMARY OF THE INVENTION

The present invention is made in an effort to solve the above described problems.

It is an object of the present invention to provide an opposite-way pressure detect-type shuttle relief valve which can release excessive pressure applied to opposite directions of the valve, such that when making a hydraulic circuit by using the valve of this kind, the number of the valve can be minimized.

It is another object of the present invention to provide an opposite-way pressure relief valve which is small in size while having a large capacity.

To achieve the above objects, the present invention provides a shuttle relief valve comprising a housing provided with a left and a right conduit holes respectively connected to the left and right conduits which are arranged between a pressure source and a hydraulic motor in a hydraulic circuit system, and a space portion communicating said conduit holes with each other; a spool slidably disposed in said space portion so that the space portion is selectively opened or closed by the movement of the spool; a spring means for urging said spool into the position in which said space portion is closed; and a left cover fitted in one hollow portion of said housing formed on one side of said space portion so that it supports the movement of the left portion of said spool, and a bushing fitted in the other hollow portion of said housing formed on the other side of said space portion so that it supports the movement of the right portion of said spool.

In the present valve, said spool has a left pressure acting face formed on one end of the left portion of the spool, a reght pressure acting face formed on one end of the middle portion of the spool, a compensation pressure acting face formed on the other end of the middle portion of the spool, and a hydraulic fluid passage formed between the left pressure acting face of the left portion and the right portion of the spool.

According to a feature of the present invention, the spool has a structure satisfying following formula:

$$F_s = F_1 = F_2 - F_c$$

where $F_s$: Reacting force of the spring means.

$F_1$: Rightward acting force of hydraulic pressure applied to the left conduit.

$F_2$: Leftward acting force of hydraulic pressure applied to the right conduit.

$F_c$: Leftward acting force of compensating pressure of hydraulic pressure applied to the right conduit.

And, according to the present invention, the spool has a structure satisfying following formula:

$$D_3 = 2D_2^2 - D_1^2$$

where

D1: Diameter of the right portion of the spool,

D2: Diameter of the left portion of the spool,

D3: Diameter of the middle portion of the spool.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENT

Figure 1:
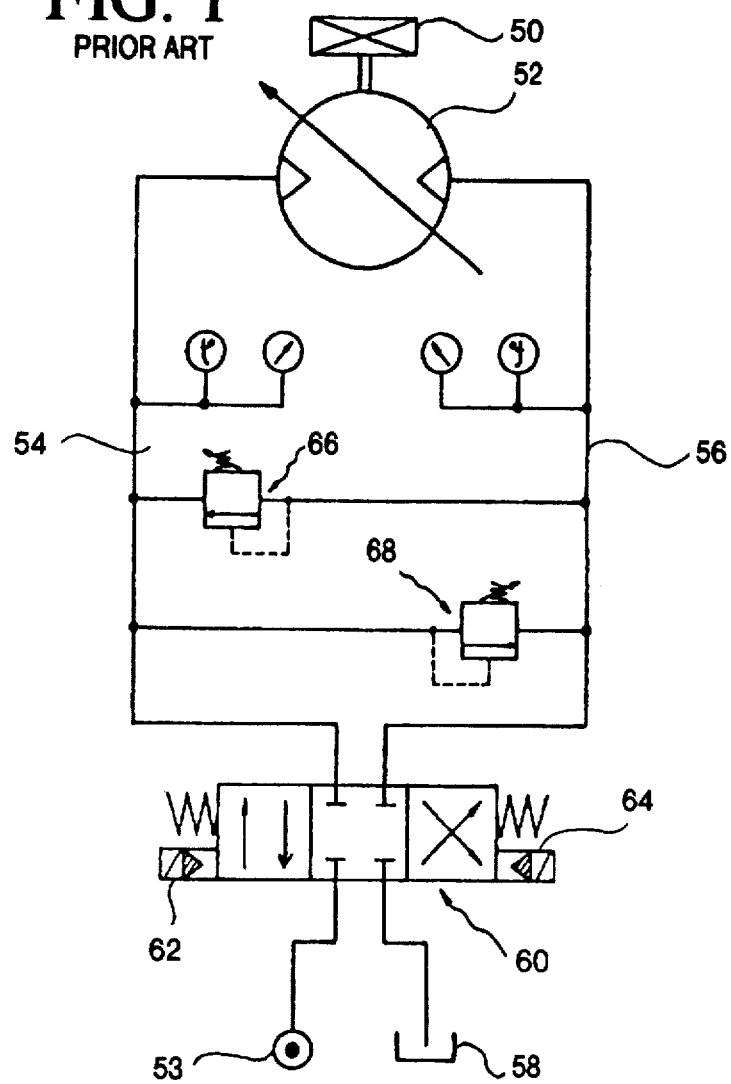
FIG. 1 is a hydraulic circuit diagram where a conventional one-way relief valve is applied.
Figure 2:
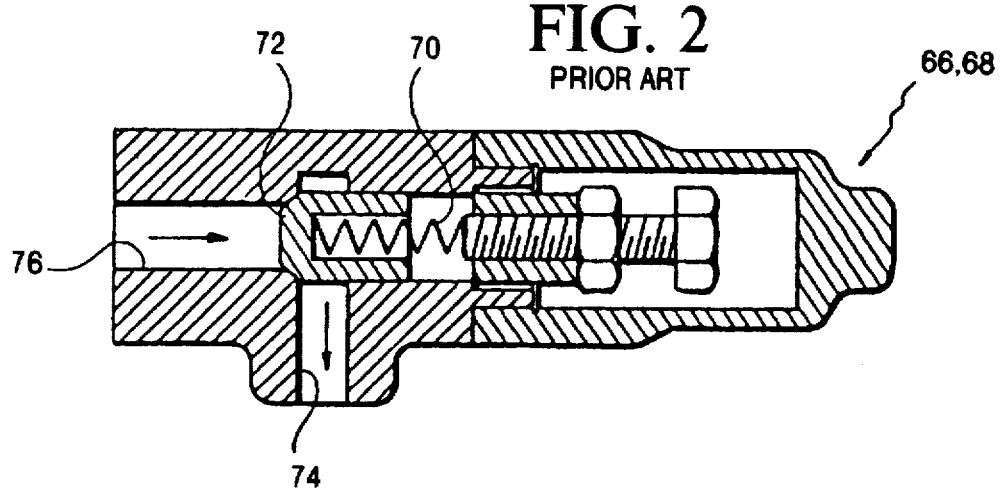
FIG. 2 is a sectional view illustrating a conventional one-way relief valve.
Figure 3:
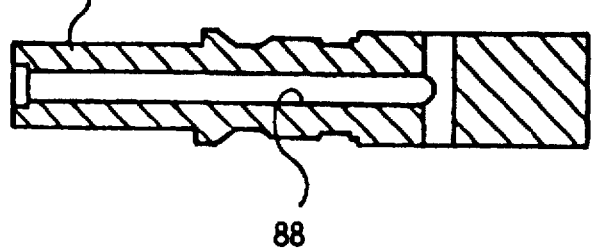
FIG. 3 is a sectional view illustrating a spool of a conventional shuttle relief valve.
Figure 4:
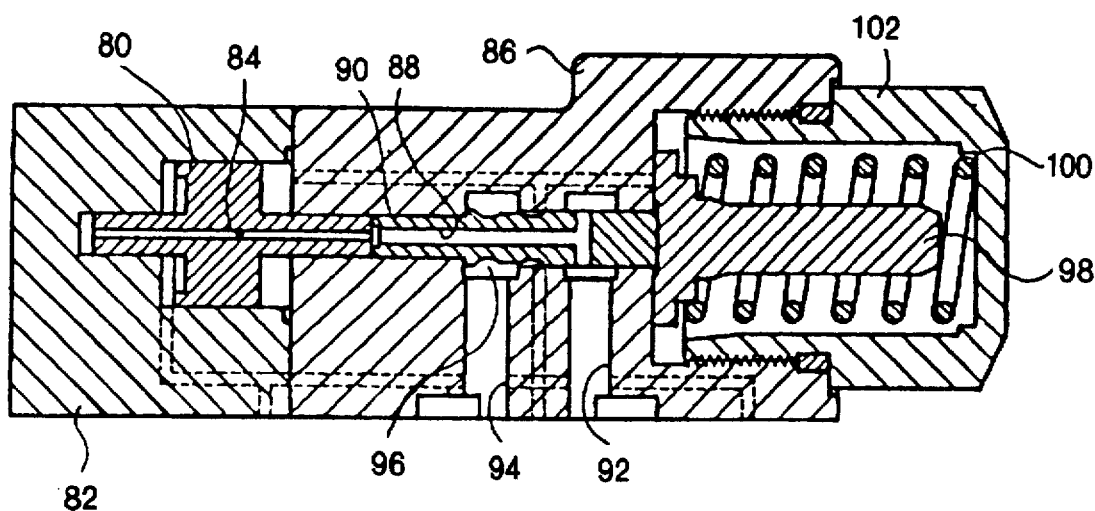
FIG. 4 is a sectional view illustrating another conventional shuttle relief valve.
Figure 5:
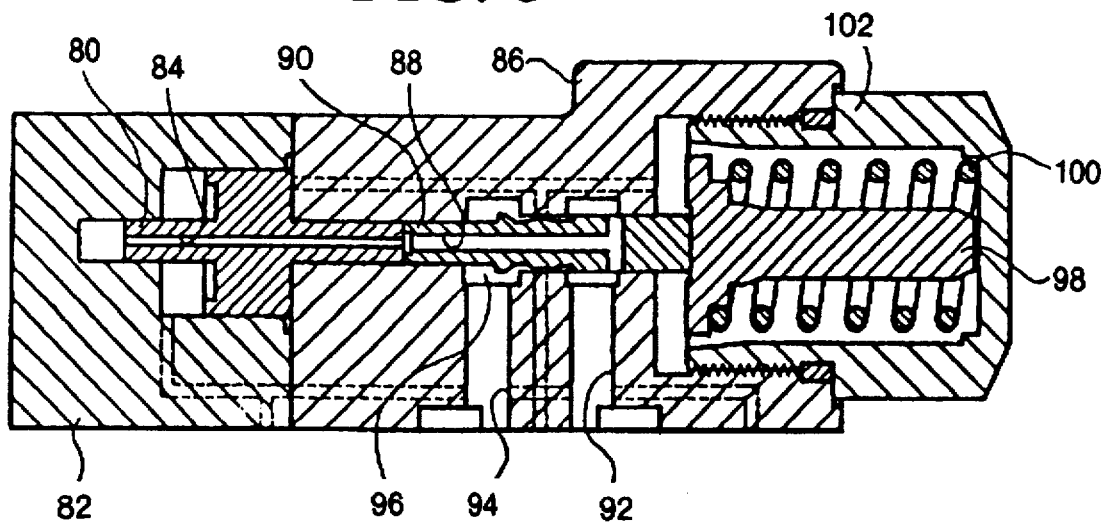
FIG. 5 is a view showing an operating state of a conventional relief valve.

A preferred embodiment of the present invention will now be described in detail with reference to the accompanying drawings.

Certain terminology will be used in the following description for convenience only and will not be limiting. The words "right" and "left" will designate directions in the drawings to which reference is made.

Figure 6:
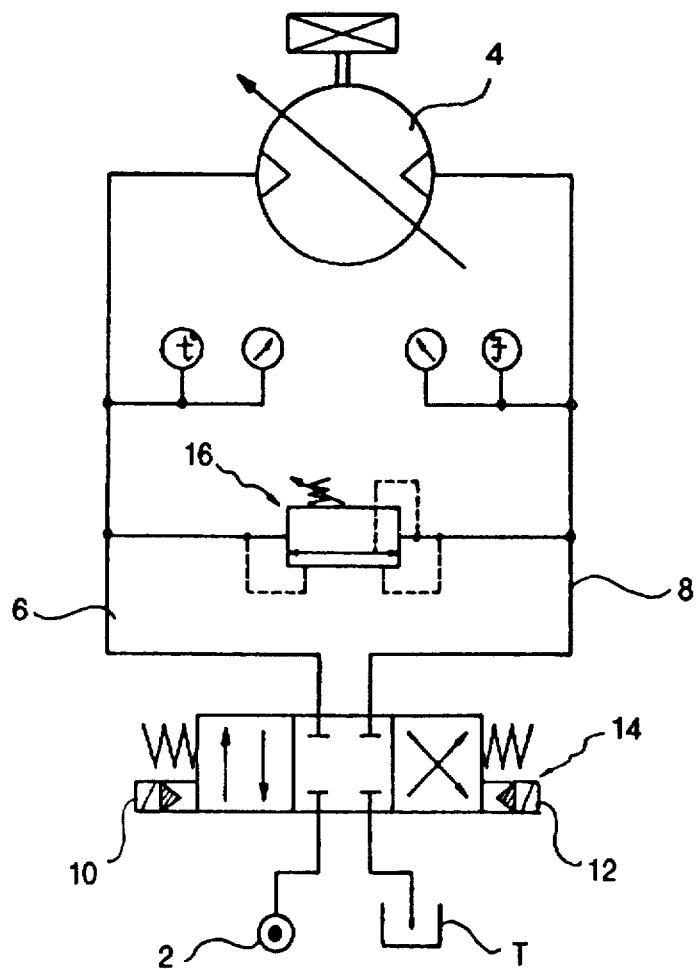
FIG. 6 is a hydraulic circuit diagram where a relief valve according to a preferred embodiment of the present invention is applied.

FIG. 6 is a hydraulic circuit diagram where a relief valve according to a preferred embodiment of the present invention is applied. The hydraulic circuit includes a pressure source 2, a hydraulic motor 4 connected through first and, second conduits 6 and 8 to the pressure source 2, and a directional control valve 14 for changing the flow direction of working fluid in accordance with the On/Off operation of solenoid valves 10 and 12.

The directional control valve 14 communicating with the first and second conduits 6 and 8 selectively changes the flow direction of the working fluid in accordance with On/Off operation of the solenoid valves 10 and 12.

A relief valve 16 is disposed on the conduits 6 and 8 between the directional control valve 14 and the hydraulic motor 4 to selectively communicate the conduits 6 and 8 with each other so that excessive pressure in one of the conduits be relieved.

On the one hand, the directional control valve 14 may have a counter balance valve for maintaining working fluid flowing along the conduits 6 and 8 in a predetermined pressure state.

The relief valve 16, as shown in FIGS. 7 to 10, comprises a housing H and is provided with left and right conduit holes 18 and 20 which are respectively connected to the conduits 6 and 8.

The housing H is provided with a space portion 22 which communicates the left and right conduit holes 18 and 20 with each other so that flow direction of the working fluid can change through this space portion 22. Hollow portions 21 and 23 are formed in the housing H on the opposite sides of the space portion 22. A left cover 24 is tightly fitted into one hollow portion 21 and a bushing 24 is also tightly fitted into the other hollow portion 23.

A spool 28 is slidably disposed in the space portion 22 wherein the left and the right portions of the spool 28 are respectively slidably inserted into the cover 24 and the bushing 26. The space portion 22 is selectively opened in accordance with the movement of the spool 28.

The spool 28 is provided with left and right pressure acting faces 30 and 32 so that the spool, when excessive pressure is applied to each face, can move rightward in the housing H.

A compensation pressure acting face 33 is further formed opposite to the right pressure acting face 32. Therefore, the rightward movement of the spool 28 is compensated by excessive pressure at the right conduit hole 20 acting on the compensation pressure acting face 33 or a predetermined hydraulic fluid acting on the left and right pressure acting faces 30 and 32, whereby the spool 28 is to move by small pressure.

The left pressure acting face 30 of the spool 28 receives excessive pressure in accordance with the working fluid flowing along the conduit 8, and the right pressure acting face 32 of the spool 28 receives excessive pressure in accordance with the working fluid flowing along the left conduit 6.

The left pressure acting face 30 is connected to the right conduit hole 20 through the hydraulic fluid passage 34 passing through the spool 28, such that the working fluid of right conduit hole 20 having excessive pressure can act on the left pressure acting face 30.

Figure 10:
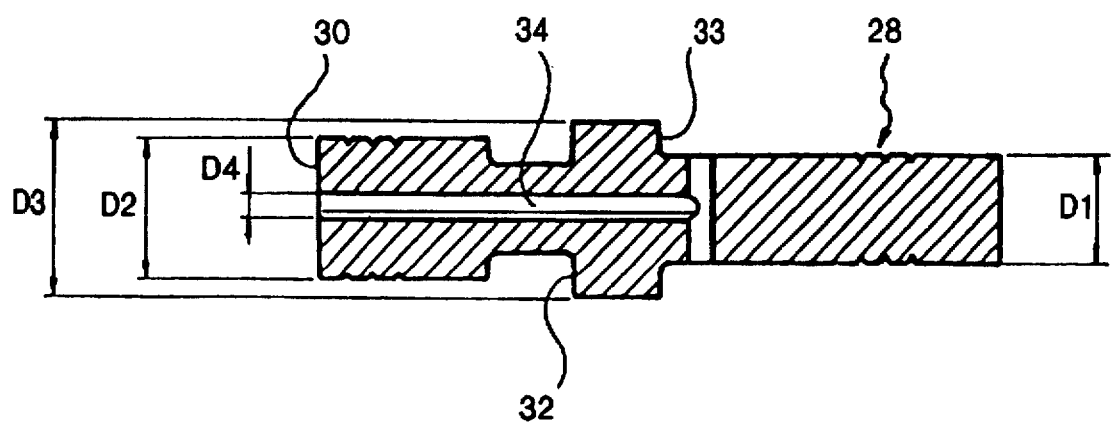
FIG. 10 is a sectional view illustrating a spool according to a preferred embodiment of the present invention.

As shown in FIG. 10, when the diameter of the right portion of the spool 28 is $D_1$, the diameter of the left portion of the spool 28 is $D_2$, and the diameter of the middle portion forming the right pressure acting face 32 and the compensation pressure acting face 33 is $D_3$, the spool 28 of the present invention is designed to satisfy the following formula:

$$D_3 = 2D_2^2 - D_1^2 \qquad (1)$$

According to this formula, the opening rate of the space portion 22 of the housing H can be maximized by the diameter $D_3$, whereby a large mount of the working fluid can flow to the left and right conduit holes 18 and 20 even when the spool 28 slightly moves.

The relief valve 16 provides a biasing means on one side of the housing H to urge the spool 28 in the returning direction thereof. This biasing means comprises a spool return end 36 which is disposed on one side of the spool 28 to bias it.

The biasing means further comprises a spring member 38 biasing the spool returning end 36 and a cap nut 40 in which the spring member 38 is elastically received and which can regulate the elastic force of the spring member 38.

The cap nut 40 is tightly screw-coupled to the housing H to be capable of a rotation movement so as to regulate the elastic force of the spring member 38. In addition, a pilot pressure conduit 42 is formed on both the housing H and the bush 26 to connect the cap nut 40 with the directional control valve 14.

Figure 11:
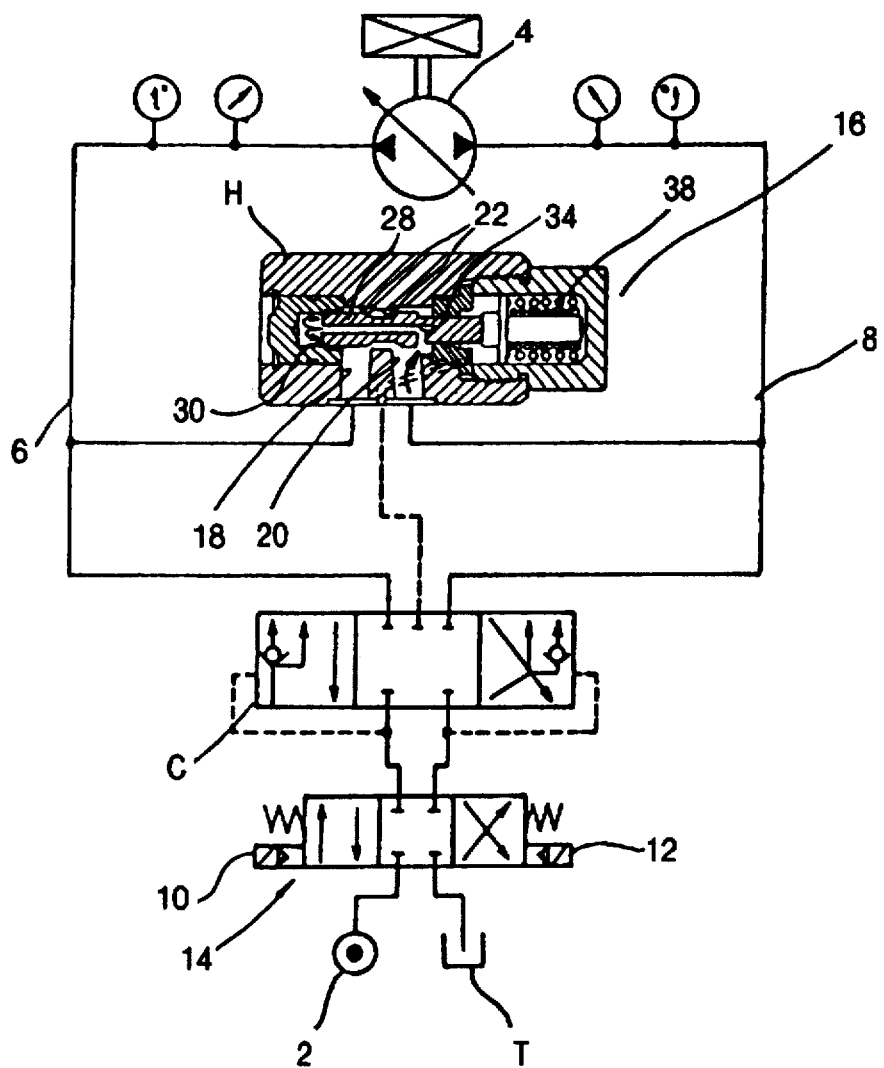
FIGS. 11 and 12 are views showing an operating state of a shuttle relief valve according to a preferred embodiment of the present invention.

Referring to FIG. 11, when the working fluid pressurized by the pressure source 2 is fed to the hydraulic motor 4 through the directional control valve 14 along the left conduit 6, it will rotate the shaft of the hydraulic motor in a clockwise direction and return to the oil tank T.

In addition, when the directional control valve changes the flow direction of the working fluid in accordance with the On/Off operation of the solenoid valves 10 and 12, the working fluid is fed to the hydraulic motor 4 through the right conduit 8, thereby rotating the hydraulic motor in a counter-clockwise direction and then returning to the oil tank T.

At this point, the directional control valve 14 is temporally in a neutral state so as to change the flow direction of the working fluid, such that both the left and right conduits 6 and 8 are closed. Under this state, the working fluid within the left conduit 6 is pumped toward the right conduit 8 by inertia force of the hydraulic motor 4.

When the directional control valve 14 operates out of the neutral state to connect the pressure source 2 to the right conduit 8, the working fluid fed to the right conduit 8 and the working fluid pressurized by the hydraulic motor 4 simultaneously flow along the right conduit 8, thereby generating excessive pressure within the right conduit 8.

As described above, the working fluid within the right conduit 8 having the excessive pressure, as shown in FIG. 6, flows to the right conduit hole 20 of the housing H of the relief valve 16 and then acts on the left pressure acting face 30 through the hydraulic fluid passage 34.

In addition, the excessive pressure acting on the left pressure acting face 30 is compensated by hydraulic pressure acting on the compensating pressure acting face 33 and acts as force obtained by following formula (2):

$$F_{SR} = (A_2 - A_1) \times P_{RR} \max - F_{SL} \qquad (2)$$

where $F_{SR}$ is general force acting on the left side for moving the spool toward the right by increasing pressure of the right side, $A_1$ is an area on which the compensating pressure acts $\{\pi/4(D_3{}^2 - D_1{}^2)\}$, $A_2$ is an area of the left face of the spool 28 on which pressure acts $\{\pi/4 * D_2{}^2\}$ ($D_4$ is a sectional area of the inner diameter of the hydraulic fluid passage 34), $P_{RR}$ max is maximum pressure acting on the left pressure acting face 30 from the right conduit 8, and FSL is right resistance force acting on the right pressure acting face 32 against pressure from the left conduit 8.

Accordingly, the spool overcomes the elastic force of the spring member 38 to thereby be displaced toward the right, thereby communicating the left and right conduit holes 18 and 20 with each other. As a result, the working fluid flows to the left conduit 6 through the right conduit 8.

At this point, since the spool 28 moves by compression force Fs of the spring member 38, which is smaller than the general force FSR, the spool 28 moves, when the excessive pressure is released, the spool 28 can be returned to its original position.

As described above, the working fluid having excessive pressure within the right conduit 8 is released by flowing to the left conduit 6 to thereby alleviate the shock force such that each part of the system can be protected from the shock force.

Figure 12:
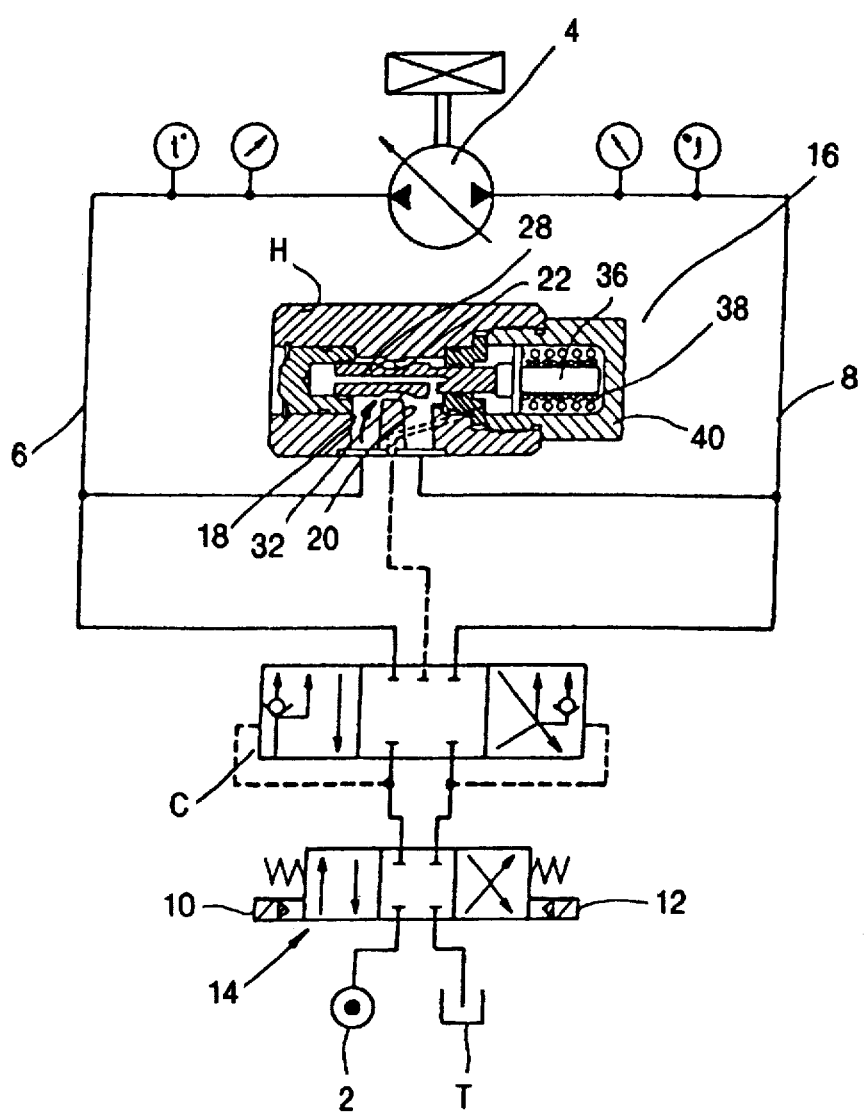

In addition, as shown in FIG. 12, when the flow direction of the working fluid is changed again by the directional control valve in accordance with the operation of the solenoid valves 10 and 12, this working fluid is again fed to the hydraulic motor 4 through the left conduit 6 to rotate it again in clockwise direction and is returned to the oil tank T through the right conduit 8.

At this point, the directional control valve 14 is temporarily in a neutral state to change the flow direction of the working fluid such that the left and right conduits 6 and 8 are both closed. At this state, the working fluid within the right conduit 8 is pumped toward the left conduit 6 by the inertia force of the hydraulic motor 4.

Further, when the directional control valve is operated out of its neutral state to communicate the pressure source 2 with the left conduit 6, the working fluid fed to the left conduit 6 and the working fluid pressurized by the hydraulic motor 4 simultaneously flow along the right conduit 8, thereby generating excessive pressure within the left conduit 6 which is obtained by following formula (3):

$$F_{SL} = A_3 \times P_{RL} \max - F_{SR} \qquad (3)$$

where $F_{SL}$ is general force acting on the right side for moving the spool toward the left by increasing pressure of the left side, $A_3$ is an area of the right face of the spool 28 on which the pressure acts $\{\pi/4(D_3{}^2 - D_2{}^2)\}$, $P_{RL}$ max is maximum pressure acting on the right pressure acting face 32 from the left conduit 6, and $F_{SR}$ is left resistance force acting on the left pressure against pressure from the right conduit 8.

Figure 7:
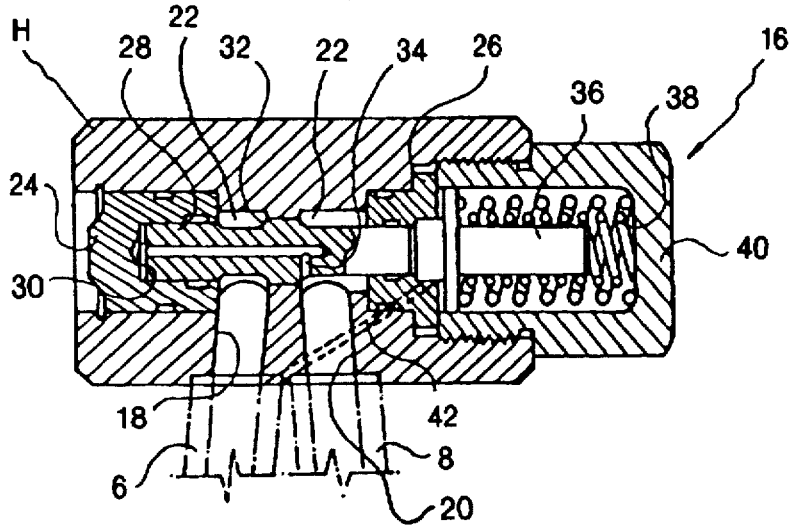
FIG. 7 is a sectional view illustrating an opposite-way pressure detecting-type shuttle relief valve according to a preferred embodiment of the present invention.
Figure 8:
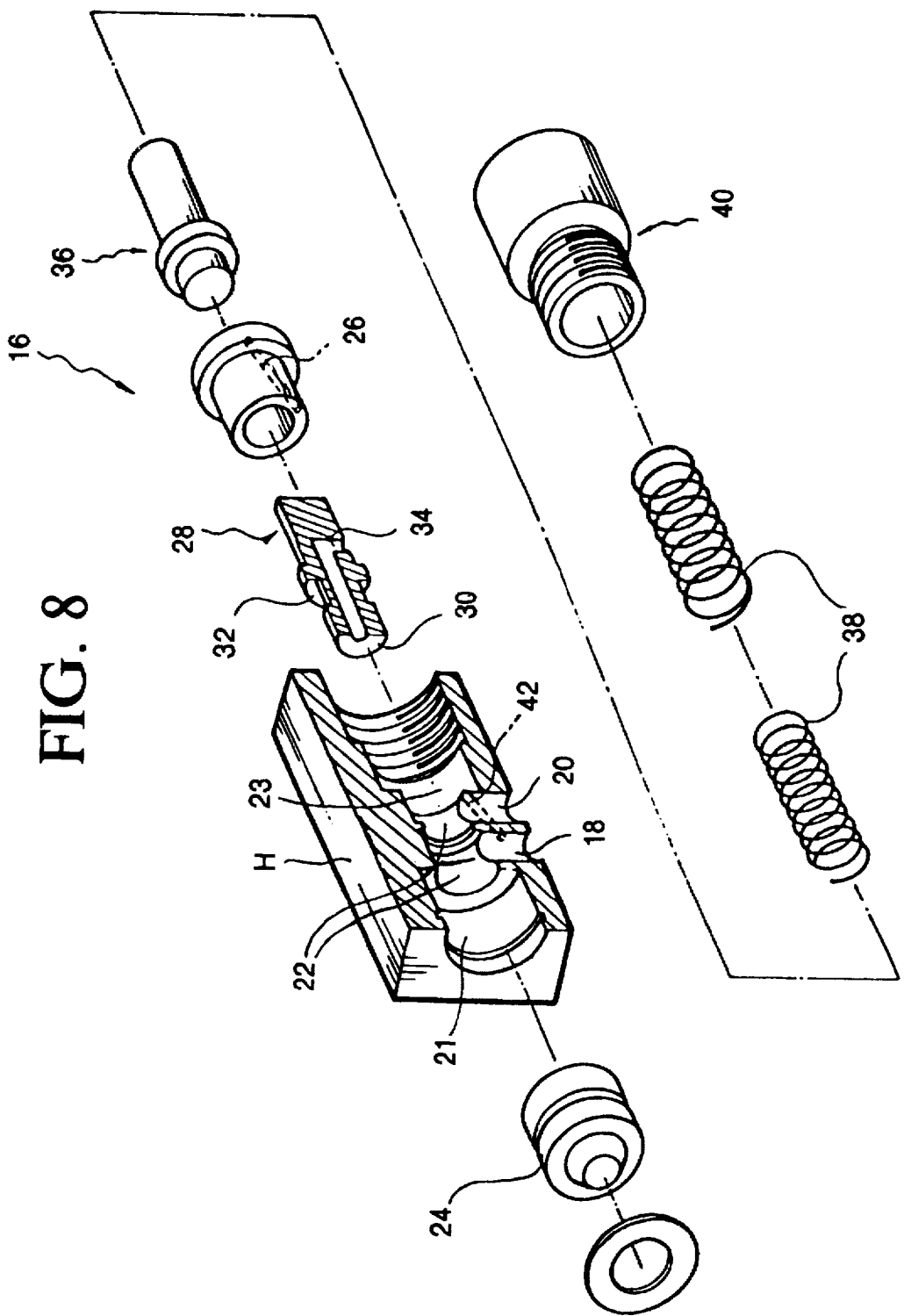
FIG. 8 is an exploded perspective view illustrating an opposite-way pressure detecting-type shuttle relief valve according to a preferred embodiment of the present invention.
Figure 9:
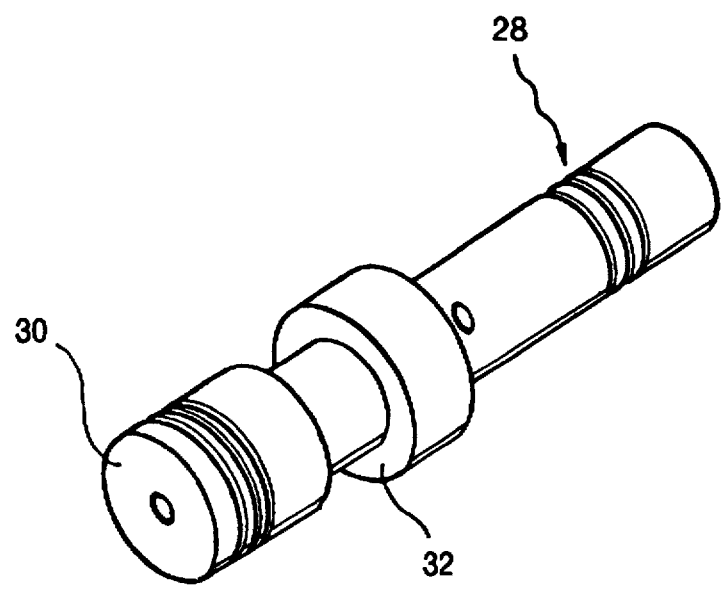
FIG. 9 is a perspective view illustrating a spool according to a preferred embodiment of the present invention.

The working fluid having such excessive pressure within the left conduit 6, as shown in FIG. 7, flows to the left conduit hole 18 of the housing H constituting the relief valve 16 and then acts on the right pressure acting face 32 of the spool 28 through the hydraulic fluid passage 34 with a capacity as obtained by the formula (2).

Accordingly, the spool 28 overcomes the elastic force of the spring member 38 to thereby be displaced toward the right, thereby communicating the left and right conduit holes 18 and 20 with each other. As a result, the working fluid flows to the right conduit 8 through the left conduit 6.

This causes the excessive pressure within the right conduit 8 to be released to thereby alleviate the shock force such that each part of the system can be protected from the shock force.

On the one hand, as described above, when the spool 28 is displaced toward the right, the elastic force of the spring member 28 is transmitted to the spool 28 through the spool return end 36. Therefore, the spool 28 is to be displaced only above a predetermined pressure and then returned to its initial position, thereby repeating the operating of the spool 28.

In addition, since the projecting amount of the cap nut 40 from the housing H can be adjusted by rotating thereof, elastic force of the spring member 38 can be regulated.

While this invention has been described in connection with what is presently considered to be the most practical and preferred embodiments, it is to be understood that the invention is not limited to the disclosed embodiments, but, on contrary, it is intended to cover various modifications and equivalent arrangements included within the spirit and scope of he appended claims.

What is claimed is:

1. A shuttle relief valve comprising:

a housing H provided with a left and a right conduit holes (18) and (20) respectively connected to the conduits (6) and (8) which are arranged between a pressure source (2) and a hydraulic motor (4) in a hydraulic circuit system, and a space portion (22) communicating said conduit holes with each other;

a spool (28) slidably disposed in said space portion (22) so that the space portion is selectively opened or closed by the movement of the spool (28); a spring member (28) for urging said spool (28) into the position in which said space portion (22) is closed; and a left cover (24) fitted in one hollow portion (21) of said housing H formed on one side of said space portion (22) so that it supports the movement of the left portion of said spool (28), and a bushing (26) fitted in the other hollow portion (23) of said housing H formed on the other side of said space portion (22) so that it supports the movement of the right portion of said spool; characterized in that said spool (28) has a left pressure acting face (30) formed on one end of the left portion with diameter $D_2$ of the spool (28), a right pressure acting face (32) formed on one end of the middle portion with diameter $D_3$ of the spool (28), a compensation pressure acting face (33) formed on the other end of the middle portion of the spool (28), and a hydraulic fluid passage (34) formed between the left pressure acting face (30) of the left portion and the right portion with diameter $D_1$ of the spool (28), wherein said spool (28) being designed to satisfy the following relation:

$$D_3 = 2D_2^2 - D_1^2.$$

* * * * *

UNITED STATES PATENT AND TRADEMARK OFFICE
CERTIFICATE OF CORRECTION

PATENT NO. : 5,765,590
DATED : June 16, 1998
INVENTOR(S) : Kim et al.

It is certified that error appears in the above-identified patent and that said Letters Patent is hereby corrected as shown below:

Abstract

In [57], delete "The present invention provides a shuttle relief valve comprising a housing provided with left and right conduit holes respectively connected to the left and right conduits which are arranged between a pressure source and a hydraulic motor in a hydraulic circuit system, and a space portion communicating the conduit holes with each other. A spool is slidably disposed in the space portion so that the space portion is selectively opened or closed by the movement of the spool. A spring urges the spool into the position in which the space portion is closed, and a left cover is fitted in one hollow portion of the housing formed on one side of the space portion so that it supports the movement of the left portion of the spool. A bushing is fitted in the other hollow portion of the housing formed on the other side of the space portion so that it supports the movement of the right portion of the spool." and insert -- A shuttle valve including a housing, a spool, and a left cover fitted in one hollow portion of the housing formed on one side of a space portion so that it supports the movement of the left portion of the spool. The housing is provided with a left and a right conduit holes connected to the conduits which are arranged between a pressure source and a hydraulic motor in a hydraulic circuit system, and the space portion communicating said conduit holes with each other. The spool is slidably disposed in the space portion so that the space portion is selectively opened or closed by the movement of the spool; a spring member for urging the spool into the position in which the space portion is closed. -- .

UNITED STATES PATENT AND TRADEMARK OFFICE
CERTIFICATE OF CORRECTION

PATENT NO. : 5,765,590
DATED : June 16, 1998
INVENTOR(S) : Kim et al.

It is certified that error appears in the above-identified patent and that said Letters Patent is hereby corrected as shown below:

In column 2, line 10, delete "rotate,for example,in a clockwise direction" and insert -- rotate, for example, in a clockwise direction -- .

In column 4, line 22, delete "a reght pressure acting face" and insert -- a right pressure acting face -- .

In column 5, line 30, delete "through first and, second conduits" and insert -- through first and second conduits -- .

In column 7, line 28, delete "and FSL is right resistance force" and insert -- and $F_{SL}$ is right resistance force -- .

In column 7, line 38, delete "general force FSR" and insert -- general force $F_{SR}$ -- .

UNITED STATES PATENT AND TRADEMARK OFFICE
CERTIFICATE OF CORRECTION

PATENT NO. : 5,765,590
DATED : June 16, 1998         PAGE 3 OF 3
INVENTOR(S) : Kim et al.

It is certified that error appears in the above-identified patent and that said Letters Patent is hereby corrected as shown below:

In column 8, line 42, delete "but, on contrary," and insert -- but, on the contrary," -- .

In column 8, line 45, delete "of he appended claims." and insert -- of the appended claims. -- .

Signed and Sealed this

Twenty-sixth Day of September, 2000

Attest:

Q. TODD DICKINSON

*Attesting Officer*          *Director of Patents and Trademarks*